US008253539B2

(12) United States Patent
Scaramozzino

(10) Patent No.: US 8,253,539 B2
(45) Date of Patent: Aug. 28, 2012

(54) RFID READER MANAGEMENT SYSTEM AND METHOD

(75) Inventor: Umberto R. Scaramozzino, Port Jefferson, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 2149 days.

(21) Appl. No.: 11/000,795

(22) Filed: Nov. 30, 2004

(65) Prior Publication Data

US 2006/0114104 A1     Jun. 1, 2006

(51) Int. Cl.
 *H04Q 5/22*        (2006.01)
(52) U.S. Cl. ........................................ 340/10.2
(58) Field of Classification Search ............... 340/10.2, 340/10.1, 825.69, 825.72, 572.1, 825.49, 340/572.2, 10.4, 5.61, 10.5, 10.3, 505
See application file for complete search history.

(56) References Cited

U.S. PATENT DOCUMENTS

| | | | | |
|---|---|---|---|---|
| 5,455,575 A * | 10/1995 | Schuermann | ................... | 342/42 |
| 5,952,922 A * | 9/1999 | Shober | ....................... | 340/572.4 |
| 6,040,774 A * | 3/2000 | Schepps | ..................... | 340/572.1 |
| 6,566,997 B1 | 5/2003 | Bradin | | |
| 6,784,842 B2 * | 8/2004 | Vesuna | .......................... | 342/463 |
| 7,084,739 B2 * | 8/2006 | Taki et al. | ..................... | 340/10.1 |
| 2004/0036575 A1 | 2/2004 | Patterson et al. | | |
| 2004/0130442 A1 * | 7/2004 | Breed et al. | ................... | 340/443 |

FOREIGN PATENT DOCUMENTS

WO     WO 02/061657 A     8/2002

OTHER PUBLICATIONS

Engels, D. W: et al., "The Reader Collision Problem", IEEE 2002 International Conference on Systems . . . , Oct. 6, 2002, pp. 647-652, vol. 7, IEEE SMC, New York, NY.

* cited by examiner

*Primary Examiner* — Vernal Brown
(74) *Attorney, Agent, or Firm* — Batholomew DiVita; Kenneth A. Haas

(57) ABSTRACT

A system and method is provided for managing RFID readers. The system and method manages RFID readers by controlling the RFID readers to reduce interference between RFID transmissions. The system and method locates RFID readers, including mobile and fixed RFID readers, and controls the transmitting of the RFID readers such that proximate readers do not transmit simultaneously. This reduces the interference between RFID readers, and thus can improve the reliability and accuracy of the RFID system.

28 Claims, 2 Drawing Sheets

RFID READER MANAGEMENT SYSTEM
AND METHOD

FIELD OF THE INVENTION

This invention generally relates to networking systems, and more specifically relates to management of radio frequency identification tag (RFID) readers.

BACKGROUND OF THE INVENTION

Radio Frequency Identification (RFID) is a technology that incorporates the use of electromagnetic or electrostatic coupling in the radio frequency spectrum to identify objects to which RFID tags are affixed. RFID systems in general provide the advantage of not requiring direct contact or line-of-sight scanning. A typical RFID system includes a plurality of RFID readers and a plurality of RFID tags that are affixed to the objects of interest. Each RFID reader includes an antenna and also includes or is coupled to a transceiver. An RFID reader uses the antenna and transceiver to transmit radio frequency signals to the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag.

Thus, an RFID reader can be used to select one or more RFID tags and retrieve data from the selected tags. As such, RFID tags can be used to identify and track large numbers of objects. Furthermore, because RFID tags have a relatively low per-unit cost, they have the ability to track large numbers of objects at relatively low costs.

One issue in large RFID deployments is the potential for interference between RFID readers. Interference can result when multiple RFID readers in an area attempt to transmit to RFID tags at the same time. This interference can prevent reliable reading of tags, thus can prevent the RFID system from accurately tracking objects.

Accordingly, it is desirable to provide an improved system and method for managing RFID readers to reduce interference between readers and improve the reliability and accuracy of the system. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

The present invention provides system and method for managing RFID readers. The system and method manages RFID readers by controlling the RFID readers to reduce interference between RFID transmissions. The system and method locates RFID readers, including mobile and fixed RFID readers, and controls the transmitting of the RFID readers such that proximate readers do not transmit simultaneously. This reduces the interference between RFID readers, and thus can improve the reliability and accuracy of the RFID system.

A variety of methods can be used to locate the RFID readers. For fixed RFID readers, the location of readers can be stored in a mapping database. Other methods of locating RFID readers include a variety of location determination techniques based on the transmission of signals to and from the RFID readers. These techniques can be applied to determine the location of both mobile and fixed readers. The system and method can then use the location of the RFID readers to control the transmitting of the readers such that proximate readers do not transmit simultaneously.

A variety of different location determination techniques based on transmitted signals can be used to determine the location of the RFID readers. For example, the system and method can use techniques such a received signal strength indication (RSSI), time difference of arrival (TDOA) and angle of arrival (AOA) of transmitted signals. Additionally, the system and method can use phase difference of arrival (PDOA) of the transmitted signals. In all these cases, the transmitted signal to and/or from the RFID reader is used to determine the location of the RFID reader.

In one specific embodiment, a real time location determination technique based on transmitted signals is combined with a mapping database to insure that a mobile reader moving through an area will not transmit simultaneously with any other proximate readers, including fixed readers and other mobile readers. This reduces the interference between the mobile RFID reader and the other readers, and thus can improve the reliability and accuracy of the RFID system.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

Figure 2:
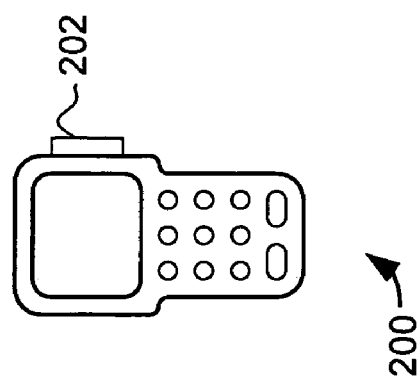
FIG. 2 is a schematic view of an mobile RFID reader in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Generally, the present invention provides a system and method for managing operation of Radio Frequency Identification (RFID) readers. The system and method manages RFID readers by controlling the RFID readers to reduce interference between RFID transmissions. The system and method locates RFID readers, including mobile and fixed RFID readers, and controls the transmitting of the RFID readers such that proximate readers do not transmit simultaneously. This reduces the interference between RFID readers, and thus can improve the reliability and accuracy of the RFID system.

RFID is a technology that incorporates the use of electromagnetic or electrostatic coupling in the radio frequency spectrum to identify objects to which RFID tags are affixed. RFID systems in general provide the advantage of not requiring direct contact or line-of-sight scanning. A typical RFID system includes an RFID reader and a plurality of RFID tags that are affixed to the objects of interest. The RFID reader, sometimes referred to as an interrogator, includes an antenna and also includes or is coupled to a transceiver. The RFID reader uses the antenna and transceiver to transmit radio frequency signals to the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag.

Thus, an RFID reader can be used to select one or more RFID tags and retrieve data from the selected tags. As such, RFID tags can be used to identify and track large numbers of objects. Furthermore, because RFID tags have a relatively low per-unit cost, they have the ability to track large numbers of objects at relatively low costs.

RFID tags are used in a variety of commercial contexts that require a unique identification system for large numbers of items. As examples, RFID tags are used in everything from department store inventory and checkout systems to the tracking of military supplies. RFID systems are often preferred for object identification due to their increased range, lack of a line of sight requirement between a tag and its reader, and high multi-tag throughput.

RFID tags are available in a variety of configurations, shapes and sizes. For example, different tags for different applications typically have a shape and size appropriate for its application. RFID tags are commonly categorized as active, passive or semi-passive. Active RFID tags include an internal battery used to transmit data and typically include the ability to read and write greater amounts of stored data than either passive or semi-passive tags. Passive RFID tags transmit by reflecting and absorbing energy from the RF transmissions from the reader, and use absorbed energy from the reader for data storage, retrieval, and manipulation. Semi-passive tags include an internal battery that is used for data storage, retrieval, and manipulation, while transmitting data by reflecting and absorbing energy from the reader.

Passive and semi-passive tags are typically lighter and less expensive than active tags. Passive tags offer a virtually unlimited operational lifetime because they do not require a battery for operation. The trade off is that they typically have a shorter read range than active tags, and require a higher output power from the reader. It is important to note that governmental restrictions in many jurisdictions restrict reader output power to ensure safety and to minimize interference between devices that must share frequency bands.

Passive and semi-passive tags include both read-only tags that are programmable once with a unique set of data that cannot be later modified, and read/writeable tags that can be rewritten one or more times using a suitable RFID writing device.

RFID systems can use a variety of techniques to transmit data to and from the tag. For transmission to the tag, the data can be transmitted using any of a variety of modulation techniques, including amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM) and amplitude shift keying (ASK).

Figure 1:
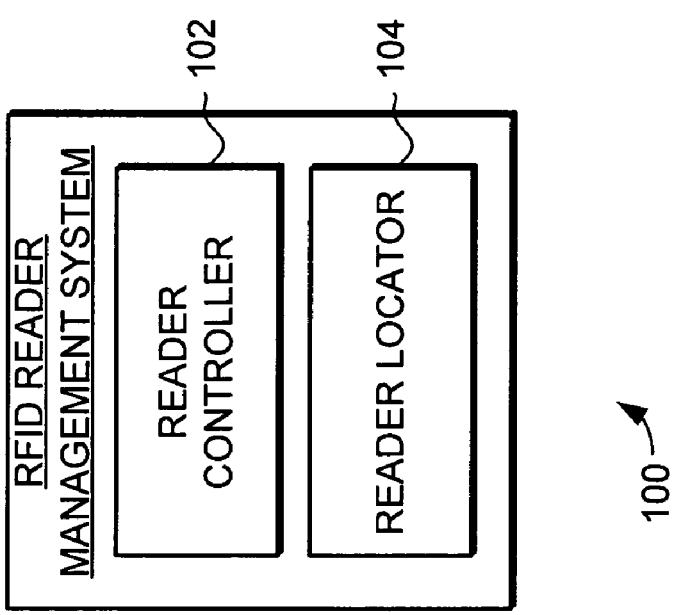
FIG. 1 is a schematic view of an RFID management system in accordance with an exemplary embodiment of the present invention.

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero"). As another example, the data can be encoded using ASK, where the tag absorb-reflects at one rate for some duration to represent a first state (e.g., "one") and ceases back scatter modulation for another duration to represent a second state (e.g., "zero"). RFID systems also typically use a variety of different frequency ranges, including 30 KHz-500 KHz, 850 MHz-950 MHz and 2.4 GHz-2.5 GHz, depending on the regulatory spectrum allocations and performance requirements matched to various application requirements. For example, lower frequency systems typically provide better electromagnetic penetration through water while higher frequency systems do not. Lower frequency passive systems commonly operate within a few inches with small reader antennas while higher frequency systems commonly operate within several feet with similarly sized antennas. Also, lower frequency regulatory allocations are generally more widespread worldwide and typically allow more output power for passive tags than do higher frequency systems. However, where higher frequency spectrum is available for RFID, such as within FCC regulated domains, the output power is substantial and allows for robust long-range performance Turning now to FIG. 1, an RFID reader management system 100 is illustrated schematically. The management system 100 includes a reader controller 102 and a reader locator 104. The management system 100 manages RFID readers by controlling the RFID readers to reduce interference between RFID transmissions. Specifically, the management system 100 uses the reader locator 104 to locate the RFID readers, including mobile and fixed RFID readers. The management system 100 uses the reader controller 102 to selectively control the transmitting of the RFID readers such that proximate readers do not transmit simultaneously. This reduces the interference between RFID readers, and thus can improve the reliability and accuracy of the RFID system.

A variety of methods can be used by the reader locator 104 to locate the RFID readers. For fixed RFID readers, the reader locator 104 can use reader locations stored in a mapping database. Other methods that can be used by the reader locator 104 include a variety of location determination techniques based on the transmission of signals to and from the RFID readers. These techniques can be applied to determine the location of both mobile and fixed readers. The reader controller 102 can then use the location of the RFID readers to control the transmitting of the readers such that proximate readers do not transmit simultaneously.

A variety of different location determination techniques based on transmitted signals can be used by the reader locator 104. For example, real-time location system (RTLS) techniques such a received signal strength indication (RSSI), time difference of arrival (TDOA) and angle of arrival (AOA) of transmitted signals, can be used. Additionally, the reader locator 104 can use phase difference of arrival (PDOA) of the transmitted signals. In all these cases, the transmitted signal to and/or from the RFID reader is used by the reader locator 104 to determine the location of the RFID reader.

In one specific embodiment, the reader locator 104 uses both location determination based on transmitted signals and stored location information from a mapping database to insure that a mobile reader moving through an area will not transmit simultaneously with any other proximate readers, including fixed readers and other mobile readers. This reduces the interference between the mobile RFID reader and the other readers, and thus can improve the reliability and accuracy of the RFID system.

Turning now to FIG. 2, an exemplary mobile RFID reader 200 is illustrated. The mobile RFID reader 550 is exemplary of the type of mobile readers that can be located and controlled using the system and method described above. The mobile RFID reader 200 is a handheld, battery powered device. Of course, other form factors can be used for the mobile RFID reader 200.

In general, the mobile RFID reader 200 includes an antenna and transceiver. The mobile RFID reader 200 uses the antenna and transceiver to transmit radio frequency signals to RFID tags. The mobile RFID reader 200 has the ability to select one or more tags by transmitting an identifier that specifies one or more of the tags from a plurality of tags. When the RFID reader 200 selects an RFID tag, the RFID tag is put into a responsive mode, with other tags going into a muted state.

When put into responsive mode, the tag transmits data back to the reader by modulating a backscattered signal that is received at the RFID reader 200 antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag. Thus, the mobile RFID reader 200 can be used to select one or more RFID tags and retrieve data from the selected tags.

The mobile RFID reader 200 suitably communicates with a computer system using wireless communication techniques. The computer system communicates wirelessly to receive data from and transmit data to the mobile reader 200. Additionally, the computer system provides the ability to control the transmitting of the mobile reader 200. The mobile RFID reader 200 can communicate with the computer system using a suitable protocol such as 802.11x or Bluetooth. As will be described in greater detail below, the communication transmissions used by the mobile RFID reader 200 for communication with the system can also be used to determine the location of the mobile RFID reader 200. In another embodiment, the RFID mobile reader 200 itself includes an RFID tag 202, and the location of the mobile RFID reader 200 can be determined using RFID backscatter-modulated signals of the RFID tag 202.

Figure 3:
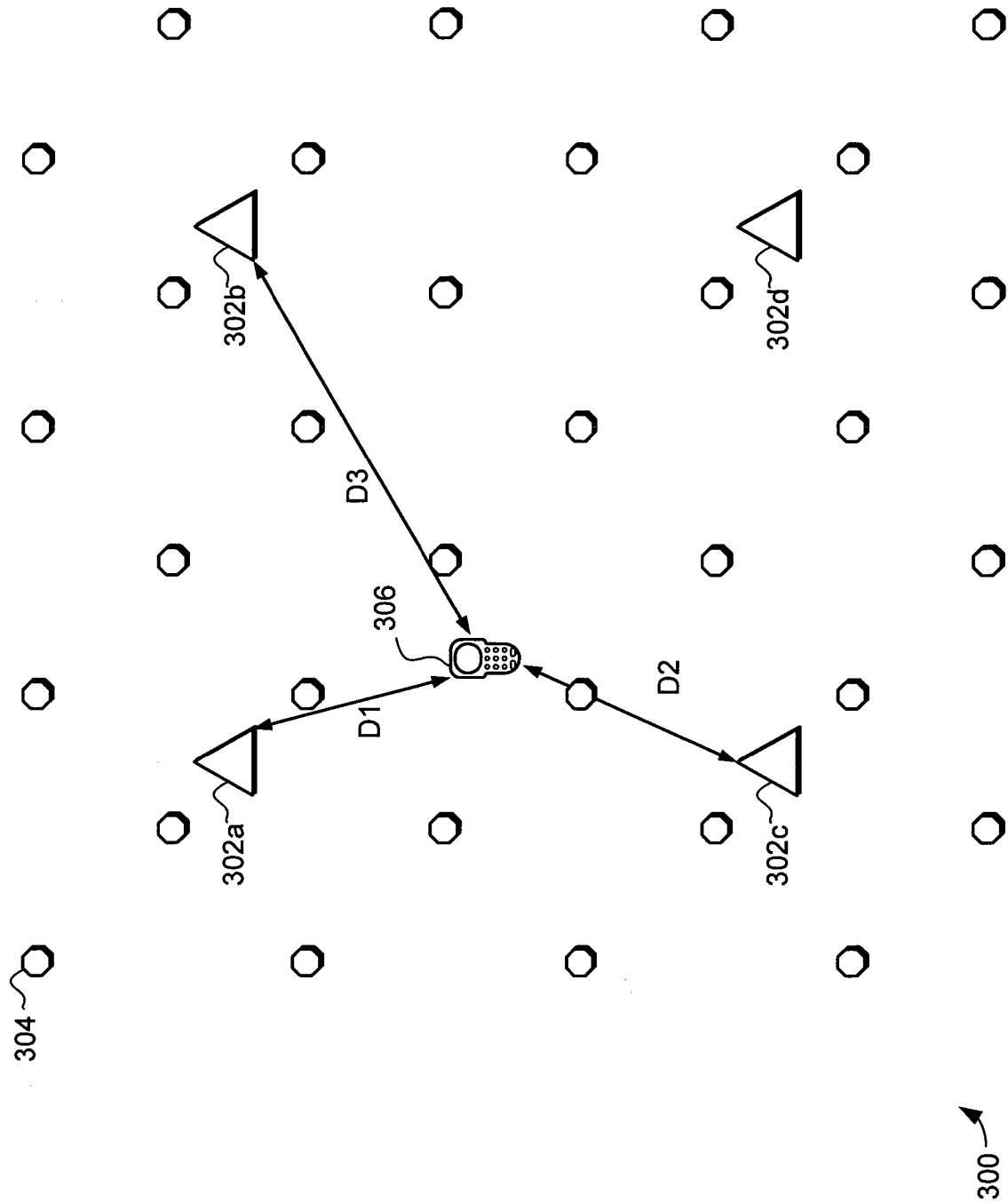
FIG. 3 is a schematic diagram of an array of RFID readers and access ports in accordance with an exemplary embodiment of the present invention.

Turning now to FIG. 3, an RFID system 300 is illustrated in accordance with an exemplary embodiment of the present invention. In this example, the RFID system 300 includes an array of access ports 302 and an array of fixed RFID readers 304. The access ports 302 provide a wireless network connection to the system for mobile RFID readers, such as mobile RFID reader 306. As such, the access ports 302 can comprise any suitable type of transmitter, such as WLAN transmitters used for 802.11x compatible devices or Bluetooth transmitters. In addition to providing a wireless network connection to the mobile RFID readers, the access ports 302 can also be used to provide the network connection to array of fixed RFID readers 304.

The access ports 302 serve as the interface to the network system that, among other things, controls the operation of RFID readers. The access ports 302 thus communicate with the RFID reader(s) using a suitable wireless communication protocol, and provide access to network using suitable networking hardware and protocols. The access ports 302 can provide a variety of functions, including device security and remote management tools. Additionally, the access ports themselves can include RFID readers. One example of an access port that can be adapted for use is the WS 2000 Wireless Switch available from Symbol Technologies, Inc. As illustrated in FIG. 3, the access ports 302 and the RFID readers 304 would typically be spread throughout an area or facility for which RFID system is being used. For example, devices can be spaced in the ceilings or floors of a large warehouse and used to locate and identify objects within the warehouse. The distance between devices would typically depend upon the range of the devices and the required coverage.

The transmissions from the access ports 302 to the mobile RFID reader and vice versa are used to determine the location of a mobile reader using a suitable technique. With the location of the mobile RFID reader determined, the system can manage the mobile RFID readers and any other proximate RFID readers to reduce interference between RFID readers. Specifically, the management system can selectively control the transmitting of the mobile and fixed RFID readers such that proximate readers do not transmit simultaneously. This reduces the interference between RFID readers, and thus can improve the reliability and accuracy of the RFID system.

In the system illustrated in FIG. 3, the mobile RFID reader 306 is proximate several other RFID readers 304. By determining the location of the mobile RFID reader 306, and also determining the location of the readers 304, the system can manage the readers such that the mobile RFID reader 306 will not transmit simultaneously with any other proximate readers, including other mobile readers.

In the system 300, the distance from the mobile RFID reader 306 to one or more the access ports 302 is determined using a suitable technique, such as RSSI or TDOA. When the distance from the mobile RFID reader 306 to the access ports 302 are calculated, the location of the mobile RFID reader 306 can be determined using these distances, the known locations of the access ports, and a suitable trilateration technique. In the example illustrated in FIG. 3, the distances D1, D2 and D3 between mobile RFID reader 306 and three access ports 302a, 302b, and 302c can be calculated and used to determine the location of the object relative to the known locations of those access ports. Three distance measurements are generally sufficient to trilaterate the position of an object, although additional measurements from other readers within range of the object can be used to provide additional accuracy. Furthermore, as few as one or two readers can be used, although with only one or two readers generating distance measurements, the location of the object cannot be completely disambiguated without additional information.

The locations of the array of fixed RFID readers 304 could likewise be computed using these techniques. However, since they RFID readers 304 are fixed, their locations could instead be manually entered into a mapping database and accessed as needed. This embodiment would work for those cases where the fixed RFID readers 304 communicate with wired connections. In either case, the locations of the array of fixed RFID readers 304 is determined and used to determine what readers in the array are proximate the mobile RFID reader 306 at any given time.

As stated above, the location of a mobile RFID reader can be determined using any suitable technique. In general, it is desirable to provide a system and method that is able to facilitate mobile RFID reader location in an efficient and cost effective manner. Some techniques are passive, meaning that standard signals can be used with standard protocols to determine location. These systems typically work by listening and extracting information transmitted from compliant transmitter on the mobile RFID reader. In some cases the signals are received by a plurality of receivers, fixed or mobile, and trilateration or triangulation is applied to locate the object. The receivers performing the location tracking can be implemented as network appliances or integrated within access points.

Several different passive methods and procedures can be used including, received signal strength indication (RSSI), time difference of arrival (TDOA) and angle or arrival (AOA). These various methods can be implemented using signals based on a variety of different protocols, including WLAN infrastructures such as those based 802.11x and other wireless networks such as Bluetooth based networks. In all of these cases, the transmitted network signals can be used to generally locate the mobile RFID reader using a suitable technique.

As one example, RSSI is a technique that can be used to determine the location of a mobile RFID reader. In RSSI, the relative signal strength of received signals is used to determine distance. Specifically, RSSI uses the strength of received signals and an estimation of the dependence between distance and received signal strength to determine the distance between a transmitting mobile RFID reader and an access port. The signal strength is measured at one or more receivers and those signal strengths are used to calculate the distance between the mobile RFID reader and the access ports. The signal strength can be measured using a variety of different techniques and devices. The distance from multiple access ports can be used to determine the location of the mobile RFID reader using trilateration based on the known location of the receivers and the distances calculated between receivers and the mobile RFID reader.

As another example, TDOA is another technique that can be used to determine location of a mobile RFID reader. In TDOA, the time of signal arrival is measured at different receivers and compared. Based on the difference of time of arrival, the general location of the mobile RFID reader transmitting the signal can be calculated. Specifically, the receiver closest to the mobile RFID reader will hear the transmission first while the farthest receiver will hear it last. Between any two receivers, the time difference of arrival can be converted to a corresponding difference in distance. Calculating the difference in distance between two receivers forms a curve called a hyperbola that indicates all possible transmitter locations. Using a third receiver to generate a different hyperbola and calculating the intersection point of the hyperbola results in a location estimate for the mobile RFID reader. This method, generally called hyperbolic trilateration can be used to determine the location of mobile RFID readers.

TDOA typically requires extremely accurate timing and synchronization to determine location. A variety of different methods can be used to provide this timing and synchronization, including the use of beacon transmitters of known location that periodically transmit synchronization code. By knowing the location of the beacon with respect to the receivers, clock offsets and phase delays through each receiver can be accounted for.

As a third example, AOA is another technique that can be used to determine the general location of a mobile RFID reader. In AOA, the angle of arrival for signals arriving at different receivers is determined and compared. The angle can be calculated using different techniques, such as with an array of antennas. Given angle of arrival measurements from at least two receivers at known locations, an estimate of location can be calculated. Based on these different angles, the general location of the mobile RFID reader transmitting the signals can be calculated.

RSSI, TDOA and AOA are thus examples of the type of passive methods that can be used to determine the location of the mobile RFID reader. In addition to passive methods, several active methods can also be used. Active methods are generally those in which the mobile RFID reader has an active role in the location process, and thus typically requires that the mobile RFID reader have specialized hardware/software in addition to the standard implementations. Examples of active methods include ranging and GPS based methods.

In ranging methods, the distance between a mobile RFID reader and receivers is calculated by measuring the amount of time it takes for a signal to propagate from the mobile unit to the receiver. Measuring the propagation delay generally requires the receiver to know the absolute time the signal was transmitted and received. Alternative methods can have the receiver retransmit the message to the mobile RFID reader and measure the round trip time. In all these cases, the transmission time is used to determine distance, and distance measurements to different receivers can be used to determine the mobile RFID reader location.

Other methods that can be used over very large areas are wide-area cellular telephony systems and GPS based systems. Systems based on these devices can locate objects over an extremely large area but are likewise limited to a very coarse location determination. For example, typical GPS based systems are limited to an accuracy of only 50 feet. GPS systems have the additional disadvantage of limited penetration into buildings, and thus are only effective in outdoor settings.

Another method that can be used to determine the location of the mobile RFID reader is Phase Difference of Arrival (PDOA) of backscatter modulated signals from RFID tags. As mentioned above with reference to FIG. 2, in some embodiments the mobile RFID reader is adapted to include an RFID tag. It should be noted the RFID tag on the mobile reader could also be implemented by emulating the behavior of a tag using an antenna, transistor, rectifier and the existing microprocessor on the mobile reader. In this example, the transistor is driven by the microprocessor to create backscatter modulation that imitates a conventional RFID tag.

The RFID tag on the mobile RFID reader can be interrogated by other RFID readers to determine the location of the mobile RFID reader. In this embodiment, the array of RFID readers transmits a plurality of signals to the RFID tag on the mobile RFID reader. Specifically, multiple RFID readers each transmit a plurality of signals having different fundamental frequencies than at least one signal transmitted by that reader. It should be noted the fundamental frequencies of transmitted signals from different RFID readers could have the same frequencies, as they are not typically directly compared.

In response to the signals transmitted by each reader, the RFID tag on the mobile RFID reader produces a plurality of backscatter-modulated signals that are received by the array of RFID readers. The distance between an RFID reader and the RFID tag is calculated using the measured phase of the backscatter-modulated signals that are received by that RFID reader, and the corresponding fundamental frequencies for the signals originally transmitted by that reader. Specifically, the change in phase with respect to the change in the frequency is used to calculate the distance between the RFID readers and the RFID tag on the mobile RFID reader. Specifically, the distance (D) between the RFID reader and the RFID tag can be calculated as:

$$D = \frac{\Delta\phi}{\Delta f} \frac{c}{4\pi} \quad (1.)$$

Where $\Delta\phi$ is the change in phase of the backscatter-modulated signals, $\Delta f$ is the change in fundamental frequency of the transmitted signals, and c is the speed of light in meters per second or feet per second depending on the desirable units of the distance measurement. Thus, the distance can be calculated using the rate of change in the phase ($\Delta\phi$) of the backscatter-modulated signals versus the rate of change in the fundamental frequency ($\Delta f$) of the transmitted signals.

Preferably, multiple signals are transmitted and backscatter modulated from the RFID tag to each RFID reader until the change in phase with respect to the change in fundamental frequency can be calculated within a specified confidence level. As one example, a linear trend of phase change with respect to fundamental frequency change can be determined by performing a least squares fit analysis of the multiple phase measurements and the corresponding fundamental frequencies. This linear trend is a more accurate "estimated slope" of the phase change versus the frequency change. As the number of the measurements increases, the accuracy of the estimated slope and the calculated distance increases. This process can be continued until the least squares fit generates an estimated slope that is within a desired confidence level, where the confidence level can be calculated using any suitable technique such as "goodness of fit" or any other method of assessing the variance of the data trend from a straight line. This process is then continued until the distance from each reader within range of the tag is known at the desired confidence level. When the distance from the tag to each RFID reader is calculated, the location of the mobile RFID reader can be determined using these distances, the known locations of the other readers, and a suitable trilateration technique.

Another variation on the PDOA method uses a "reverse infrastructure" procedure to determine the location of the mobile RFID reader. In this embodiment a plurality of RFID tags are installed around the area of interest at known locations. The mobile RFID reader can then selectively interrogate these tags, and, using the PDOA method described above, determine the distance between these tags and the mobile RFID reader. From the distance calculated to each tag, and the known locations of each tag, the location of the mobile reader can be determined using triangulation techniques. This method is generally referred to as "reverse infrastructure". More information about a reverse infrastructure method can be found at the U.S. patent application entitled "Reverse Infrastructure Location System and Method", Ser. No. 10/954,957

More information about how PDOA of backscatter-modulated signals from RFID tags can be used to determine the location of the mobile RFID reader can be found at the U.S. patent application entitled "Object Location System and Method Using RFID", Ser. No. 10/791,329.

It should also again be noted that while the real time location system methods described above have been described with reference to determining the location of mobile readers, these same methods can be used to determine the location of fixed readers as well. In one example, a fixed reader is designated as the reference point. The location methods above are then used to determine the relative location of the other fixed readers relative to the reference point. When determined, the location of each RFID reader is added to a mapping database used by the management system to control operation of the RFID readers.

As described above, the RFID reader management system and method uses a reader controller to selectively control the transmitting of the RFID readers such that proximate readers do not interfere with each other, and thus can improve the reliability and accuracy of the RFID system.

In general, the RFID reader management system and method will use the real-time location information about the fixed and mobile RFID readers in the system as a basis for controlling the operation of the RFID readers to reduce interference. Typically, those readers that are close enough to each other such that their transmissions may interfere will be selectively controlled to such that they do not transmit simultaneously. This reduces the interference between RFID readers, and thus can improve the reliability and accuracy of the RFID system.

In one embodiment, the RFID reader management system uses a mapping of the readers to control their operation. The RFID management system assigns each reader in the map a time slice in which the RFID reader broadcasts. When a mobile RFID reader moves into the area its location is determined using the various real time location methods discussed above. The mobile reader is then added to the map at its present location and assigned a time slice by the system, with that time slice selected not to interfere with any other nearby readers. Specifically, the known location of the mobile reader and the other readers in the area is used to assign the various time slices such that the readers are each assigned a time slice that does not interfere with any other proximate readers. As the mobile reader moves its location is updated, it is assigned a new position in the map, and is assigned a new time slice.

In one embodiment, this update occurs each time a mobile reader is activated by the user. For example, when the user triggers the mobile reader its location is determined, it is added to the mapping of readers and assigned a time slice by the management system. The mobile reader then broadcasts in its assigned time slice. This process would be repeated each time the user activates the mobile reader. Alternatively, the location determination, mapping, and assignment of time slices can be done continuously by the system as the mobile RFID reader moves through the area.

The mapping of RFID readers used by the RFID management system can include all RFID readers in the area, with all readers assigned a time slice at all times. In the alternative, only active RFID readers can be assigned time slices in the mapping. This would generally be preferable when the bandwidth available is limited.

Thus, the present invention provides a system and method for managing RFID readers. The system and method manages RFID readers by controlling the RFID readers to reduce interference between RFID transmissions. The system and method locates RFID readers, including mobile and fixed RFID readers, and controls the transmitting of the RFID readers such that proximate readers do not transmit simultaneously. This reduces the interference between RFID readers, and thus can improve the reliability and accuracy of the RFID system.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An RFID reader management system, the RFID reader management system comprising:
    an RFID reader locator, the RFID reader locator locating a mobile RFID reader and at least one other RFID reader; and
    an RFID reader controller, the RFID reader controller determining if any RFID reader in the at least one other RFID reader is proximate to the mobile RFID reader, the RFID reader selectively controlling the mobile RFID reader and the at least one other RFID reader such that the mobile RFID reader and the any RFID reader in the least one other RFID reader that is determined to be proximate to the mobile RFID reader do not transmit simultaneously to reduce interference between the mobile RFID reader and the at least one other RFID reader.

2. The system of claim 1 wherein the RFID reader locator locates the mobile RFID reader using received signal strength.

3. The system of claim 1 wherein the RFID reader locator locates the mobile RFID reader using time difference of arrival.

4. The system of claim 1 wherein the RFID reader locator locates the mobile RFID reader using angle of arrival.

5. The system of claim 1 wherein the RFID reader locator locates the mobile RFID reader using phase difference of arrival of backscatter modulated signals from an RFID tag.

6. The system of claim 1 wherein the mobile RFID reader includes a mobile RFID reader RFID tag and wherein the mobile RFID reader tag is utilized to determine a location of the mobile RFID reader.

7. The system of claim 1 wherein the mobile RFID reader communicates using an 802.11x protocol transmission and wherein the RFID reader locator uses an 802.11x protocol transmission to locate the mobile RFID reader.

8. The system of claim 1 wherein the mobile RFID reader communicates using a Bluetooth protocol transmission and wherein the RFID reader locator system uses the Bluetooth protocol transmission to locate the mobile RFID reader.

9. The system of claim 1 wherein the RFID reader locator locates the at least one other RFID reader using an RFID reader mapping database.

10. The system of claim 1 wherein the at least one other RFID reader comprises an array of fixed RFID readers.

11. The system of claim 1 wherein the RFID reader controller selectively controls the mobile RFID and the at least one other RFID reader by assigning each of the mobile RFID and the at least one other RFID reader a different time slice.

12. The system of claim 11 wherein the RFID reader locater locates the mobile RFID reader RFID reader when a user activates the mobile RFID reader, and wherein the RFID reader controller assigns the mobile RFID reader a time slice when activated by the user and located.

13. A method of managing RFID readers, the method comprising the steps of:
    locating a mobile RFID reader and at least one other RFID reader;
    determining if any RFID reader in the at least one other RFID reader is proximate to the mobile RFID reader; and
    controlling the mobile RFID reader and the at least one other RFID reader such that the mobile RFID reader and the any RFID reader in the least one other RFID reader that is determined to be proximate to the mobile RFID reader do not transmit simultaneously to reduce interference between the mobile RFID reader and the at least one other RFID reader.

14. The method of claim 13 wherein the step of locating comprises locating the mobile RFID reader using received signal strength.

15. The method of claim 14 wherein the step of locating comprises locating the mobile RFID reader using time difference of arrival.

16. The method of claim 13 wherein the step of locating comprises locating the mobile RFID reader using angle of arrival.

17. The method of claim 13 wherein the step of locating comprises locating the mobile RFID reader using phase difference of arrival of backscatter modulated signals from an RFID tag.

18. The method of claim 13 wherein the mobile RFID reader includes a mobile RFID reader RFID tag and wherein the step of locating comprises locating the mobile RFID reader using the RFID tag.

19. The method of claim 13 wherein the mobile RFID reader communicates using an 802.11x protocol transmission and wherein the step of locating comprises using the 802.11x protocol transmissions to locate the mobile RFID reader.

20. The method of claim 13 wherein the mobile RFID reader communicates using a Bluetooth protocol transmission and wherein the step of locating comprises using the Bluetooth protocol transmission to locate the mobile RFID reader.

21. The method of claim 13 wherein the step of locating comprises locating the at least one other RFID reader using an RFID reader mapping database.

22. The method of claim 13 wherein the at least one other RFID reader comprises an array of fixed RFID readers.

23. The method of claim 13 wherein the step of controlling the mobile RFID reader and the at least one other RFID reader to reduce interference between the mobile RFID reader and the at least one other RFID reader comprises assigning each of the mobile RFID and the at least one other RFID reader a different time slice.

24. The method of claim 23 wherein the step of locating the mobile RFID reader comprises locating the mobile RFID when a user activates the mobile RFID reader, and wherein the step of controlling the mobile RFID reader and the at least one other RFID reader to reduce interference between the mobile RFID reader and the at least one other RFID reader comprises assigning the mobile RFID a time slice when activated by the user and located.

25. An RFID reader management system, the RFID reader management system comprising:
- an RFID reader locator, the RFID reader locator locating a mobile RFID reader in real time;
- an RFID reader controller, the RFID reader controller determining what other RFID readers in an array of RFID readers are proximate to the mobile RFID reader, the RFID reader controller assigning the mobile RFID reader a different time slice than the other RFID readers in the array of RFID readers that are determined proximate the mobile RFID reader.

26. The system of claim 25 wherein the RFID reader locater locates the mobile RFID reader RFID reader when a user activates the mobile RFID reader, and wherein the RFID reader controller assigns the mobile RFID reader a time slice when activated by the user and located.

27. A method of managing RFID readers, the method comprising the steps of:
- locating a mobile RFID reader in real time;
- determining what other RFID readers in an array of RFID readers are proximate to the mobile RFID reader; and
- assigning the mobile RFID reader a different time slice than the other RFID readers in the array of RFID readers that are determined proximate the mobile RFID reader.

28. The method of claim 27 wherein the step of locating the mobile RFID reader comprises locating the mobile RFID when a user activates the mobile RFID reader, and wherein the step of assigning the mobile RFID reader a different time slice than the other RFID readers in the array of RFID readers comprises assigning the mobile RFID a time slice when activated by the user and located.

* * * * *

UNITED STATES PATENT AND TRADEMARK OFFICE
CERTIFICATE OF CORRECTION

PATENT NO. : 8,253,539 B2  Page 1 of 1
APPLICATION NO. : 11/000795
DATED : August 28, 2012
INVENTOR(S) : Scaramozzino It is certified that error appears in the above-identified patent and that said Letters Patent is hereby corrected as shown below:

On the Title Page, in Item (74), under "Attorney, Agent, or Firm", in Column 2, Line 1, delete "Batholomew" and insert -- Bartholomew --, therefor.

In Column 2, Line 19, delete "such a" and insert -- such as --, therefor.

In Column 4, Line 43, delete "performance" and insert -- performance. --, therefor.

In Column 5, Line 4, delete "such a" and insert -- such as --, therefor.

In Column 9, Line 24, delete "Where" and insert -- where --, therefor.

In Column 10, Line 3, delete "10/954,957" and insert -- 10/954,957. --, therefor.

Signed and Sealed this
Fifth Day of February, 2013

Teresa Stanek Rea
*Acting Director of the United States Patent and Trademark Office*